Figure 3:
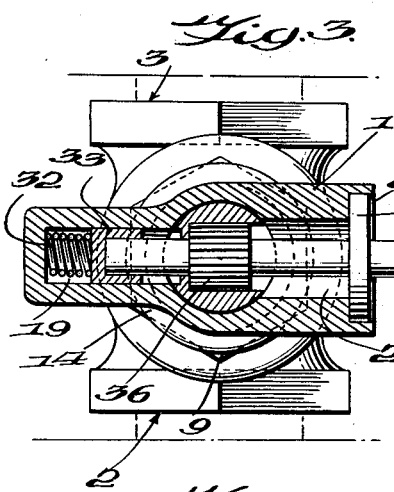

Sept. 3, 1940.  J. E. WALL  2,213,264
LOCK
Filed June 29, 1937   2 Sheets-Sheet 1
Fig. 1.
Fig. 2.
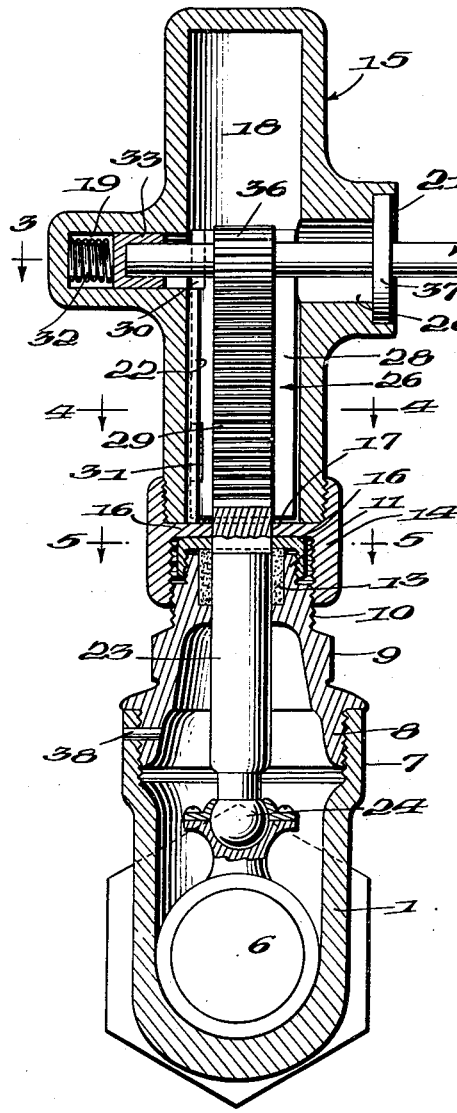
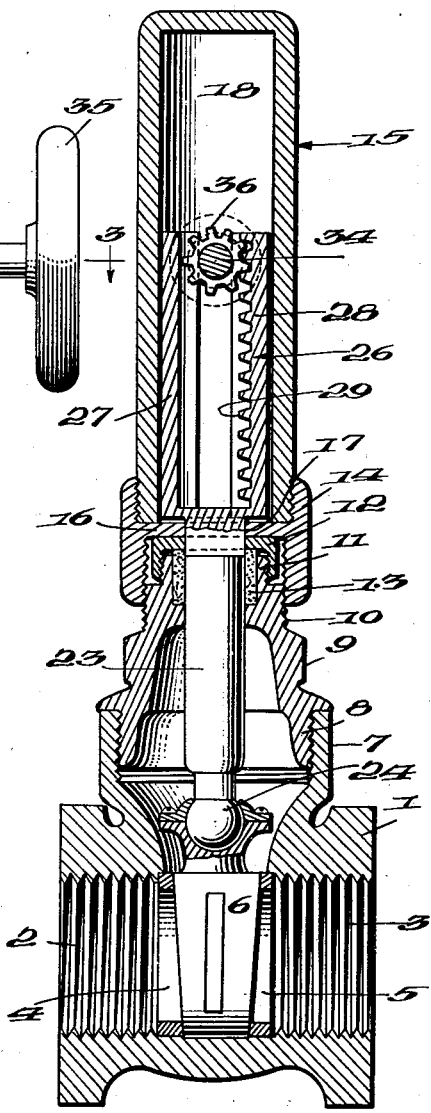
Inventor:
Joseph E. Wall,
By Smith, Michael & Gardiner
Attorneys Sept. 3, 1940.  J. E. WALL  2,213,264
LOCK
Filed June 29, 1937  2 Sheets-Sheet 2

Inventor:
Joseph E. Wall,
By Smith, Michael & Gardiner,
Attorneys.

Patented Sept. 3, 1940

2,213,264

UNITED STATES PATENT OFFICE 2,213,264

LOCK

Joseph E. Wall, St. Louis, Mo.

Application June 29, 1937, Serial No. 151,007

8 Claims. (Cl. 70—181)

My invention relates to valves, and has particular reference to a valve including a valve disc or member movable into and out of contact with a suitable valve seat to control fluid flow through the valve casing and through the supply system or pipe line in which the valve is installed.

It is an object of my invention to provide a valve in which the movements of the valve disc or member are effected by means of an operating handle which is removable with respect to the valve casing, whereby, when the valve has been moved to open or closed position and the operating handle removed from the casing, the position of the valve cannot be changed except by the employment of the same or substantially the same type operating handle. Hence, the valve of my present invention may be properly referred to as a "lock valve," as the special operating handle functions as a "key" and possession of the same or of a duplicate handle is necessary to move the valve disc or member from its locked position.

It is an object of my invention to provide a valve of the reciprocating type in which the reciprocating movements of the valve disc or member are effected by a rack and pinion drive, the rack being formed on or attached to the valve stem, and the pinion being formed on the operating handle, which handle, after serving to move the valve member to either open or closed position, may be removed from the valve casing.

It is an object of my invention to provide a valve including means for locking the valve disc or member in either the open or closed position, which locking means is unlocked upon the insertion of the valve operating handle. Hence, the operating handle serves the dual purpose of unlocking the valve and also moving the valve member from open or closed positions.

It is a further object of my invention to provide a composite valve casing in which the parts thereof are so constructed and arranged that, when assembled, portions thereof are interlocked with the valve stem so that such portions cannot be disassembled as long as the valve member remains in closed position. By virtue of this construction, the valve is rendered "fool proof," and when the valve member is moved to closed position and locked therein, the several parts of the valve casing are positively locked to the valve stem, whereby the casing cannot be taken apart by unauthorized persons who might desire to open the valve without the employment of the necessary operating handle or "key."

It is a further object of my invention to provide a valve of the above mentioned character that is simple in construction and operation, cheap and easy to manufacture and assemble, strong and durable, and highly efficient in the purposes for which designed.

While the valve of my present invention is capable of many uses, the same is especially useful as a means for controlling the water supply from municipal water mains to individual residences, apartments, factories or the like. When utilized in such installations, the duly authorized agent of the municipality is supplied with a suitable operating handle which can be used to open the valve, or to close the valve if for any reason, such as discontinuance of service, non-payment of water rent, etc., it becomes necessary that the valve member be moved to and retained in closed position.

Figure 6:
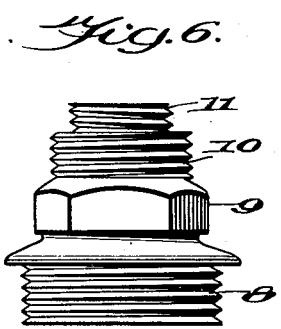
Figure 7:
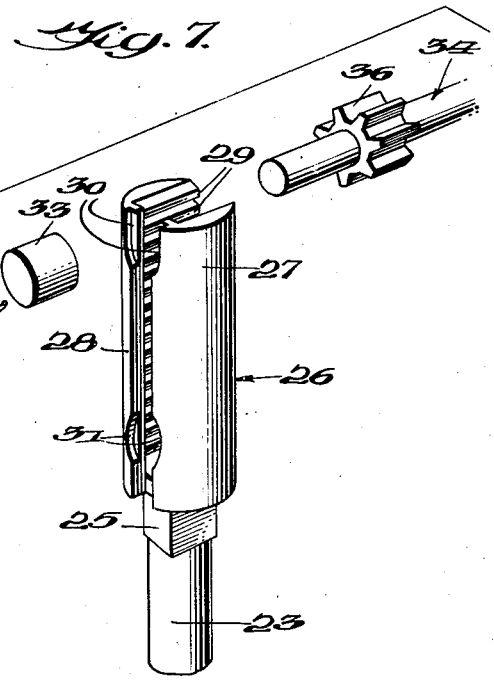
Figure 5:
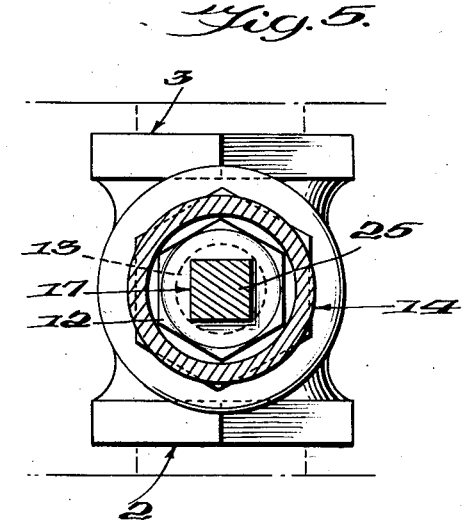

Referring to the accompanying drawings wherein for the purpose of illustration, I have shown a preferred embodiment of my invention, Figure 1 is a vertical sectional view of a valve embodying the features of my present invention and showing the valve member in closed position, Fig. 2 is a vertical sectional view of the valve shown in Fig. 1, this view being taken at right angles to that of Fig. 1, Figs. 3, 4 and 5 are transverse sectional views on the lines 3—3, 4—4 and 5—5, respectively, of Fig. 1, Fig. 6 is a front elevation of a portion of the composite valve casing, and, Fig. 7 is an exploded, perspective, fragmentary view of the spring-pressed detent, the upper portion of the valve stem, and the inner end of the removable operating handle.

In the accompanying drawings, wherein like reference numerals are employed to designate like parts throughout the several views, the numeral 1 designates the base portion of the valve casing, this base portion being provided with aligned, internally-threaded inlet and outlet openings 2 and 3, at the inner, opposed ends of which are positioned valve seats 4 and 5, the inner faces of these seats being tapered to cooperate with a tapered, imperforate valve disc 6, it being understood that when the said valve disc 6 is in its lowermost position, as shown in Fig. 2, the tapered valve disc 6 firmly engages the inner, tapered faces of the valve seats 4 and 5 and prevents the flow of fluid through the valve casing. The upper end 7 of the base portion 1 is internally threaded and receives therein the lowermost threaded portion 8 of the casing section shown in Fig. 6, it being noted that the internal threads in the upper end 7 of the valve casing portion 1 and the cooperating, external threads of the lowermost threaded portion 8 are "right hand" threads. Immediately above the threaded portion 8 of this valve casing portion is a square, hexagonal or other non-circular portion 9 adapted for engagement by a suitable wrench to assist in screwing the sections together. Immediately above the non-circular portion 9 is a second screw-threaded portion 10, the threads of which are "right hand" threads, and immediately above the threaded portion 10 is a screw-threaded portion 11 constituting the upper end of this portion of the composite valve casing, the threads on this upper end portion 11 being "left hand" threads. A flanged packing and locking cap 12 is screwed on to the threaded portion 11, the internal threads of this cap being "left hand" threads and the outer surface of this cap being of square, hexagonal or other non-circular configuration, whereby a wrench may be utilized to screw this cap on to the portion 11. The upper surface of this cap 12 is provided with a square, centrally positioned opening for a purpose to be hereinafter described, and when this cap is screwed on to the threaded portion 11, said cap functions to compress a suitable packing 13 positioned within a bore or chamber at the upper end of this section of the composite valve casing.

A coupling 14 is employed as a means for attaching the upper portion 15 of the composite valve casing to the intermediate portion including the threaded surfaces 8, 10 and 11. This coupling 14 is divided intermediate its length by a transversely-extending wall or partition 16, provided with a centrally-positioned, square opening 17 of a size and shape corresponding to the opening in the cap 12. The lower portion of the coupling 14, i. e., the portion below the wall or partition 16 as viewed in Figs. 1 and 2, is internally threaded with "right hand" threads and is adapted to be screwed onto the threaded portion 10 of the intermediate portion of the composite valve casing. The upper portion of the coupling 14, i. e., the portion above the wall or partition 16 as viewed in Figs. 1 and 2, is internally threaded with "right hand" threads and is adapted to receive the lower screw-threaded portion of the upper section 15 of the valve casing.

Figure 4:
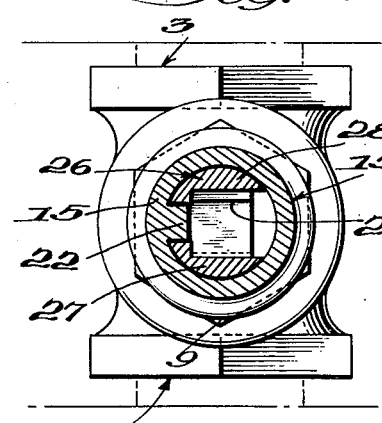

The upper section 15 of the valve casing has a relatively long, axially extending chamber 18, from one side of which extends a socket 19, the axis of which is transverse to the axis of the chamber 18. Diametrically opposite the socket 19 and in axial alinement therewith is an opening 20, which extends through the wall of the section 15 and terminates in an outer socket 21, the diameter of which is slightly greater than the diameter of the opening 20. The outer ends of the chamber 18 and of the chamber 19 are closed, as clearly shown in Fig. 1 of the accompanying drawings. Within the chamber 18 and projecting inwardly from the walls defining said chamber, is a spline or guide 22, this spline or guide preferably extending downwardly from the inner open end of the socket 19 to the lower end of the casing section 15. This spline or guide is best seen in Figs. 1 and 4 of the accompanying drawings.

The valve stem of my present invention comprises an intermediate section 23, circular in transverse cross section; a lower section comprising a spherical member 24 which constitutes one member of a ball-and-socket connection between the valve disc 6 and the valve stem; a section 25 immediately above the section 23 and preferably square in transverse cross section and of a size and shape corresponding to the opening in the packing and locking cap 12 and to the opening 17 in the partition or wall 16; and an upper section 26 immediately above the section 25, which section has an external diameter slightly less than the diameter of the chamber 18 so that said section 26 is freely and axially slidable within said chamber. The section 26 is bifurcated, i. e., has a cut out central portion which forms two sections 27 and 28 having spaced, parallel inner walls or faces, the inner wall or face of the section 27 being plain and the inner wall or face of the section 28 being provided with a series of transverse teeth 29 which constitute a rack. Each of the sections 27 and 28 are provided along one side with upper segmental recesses 30, 30 and with lower segmental recesses 31, 31 for a purpose to be hereinafter described.

As a means for retaining the valve stem in its uppermost and lowermost positions, I provide within the sockets 19 a coiled, expansion spring 32 having its outer end bearing against the end wall of the socket 19 and having its inner end engaged behind a cup-shaped detent member 33, the tendency of the said spring being to force said cup-shaped detent member 33 into the chamber 18 and into engagement with either the segmental recesses 30 or 31 depending upon the position of the valve disc 6 with respect to the valve seats 4 and 5. The actuating handle or "key" of my present invention comprises a stem 34, to one end of which is keyed a knob or handle 35, and which has keyed or splined thereon, near its opposite end, a pinion 36, the teeth of this pinion corresponding in pitch to the teeth 29 on the rack portion of the valve stem. Between the knob or handle 35 and the pinion 36, I provide the stem 34 with a disc 37 of a diameter corresponding substantially to that of the socket 21.

Referring now to the manner of assembling the composite valve casing, and to the operation of the valve and its operating mechanism, the flanged packing or locking cap 12 is screwed onto the threaded portion 11; the coupling 14 is screwed onto the threaded portion 10; and the lower end of the valve stem as viewed in Figs. 1 and 2 is inserted through the opening 17 in the partition 16 and through the opening in the cap 12 so that the spherical end portion 24 extends below the lower end of the portion 8. This spherical portion 24 is then attached to the valve disc 6, the said spherical portion 24 constituting one member of a "ball-and-socket" connection or a "swivel" connection between the stem and valve disc 6. The intermediate section of the valve casing is then attached to the base section 1 by screwing the lower portion 8 into the threaded portion 7, the valve disc 6 being thus positioned between the opposed valve seats 4 and 5 and assuming the position which it will occupy when the valve is completely closed. The attachment between the intermediate section and base section of the composite valve casing can be facilitated by applying a suitable wrench to the non-circular portion 9, it being noted that during the time the portion 8 is being screwed into the portion 7, the ball-and-socket connection between the valve stem and valve disc will permit the stem to be rotated with respect to the said valve disc. When the intermediate section of the valve casing has been securely attached to the base portion 1 of the composite casing, a hole is drilled through the interfitting portions 7 and 8 and a locking pin 38 is driven into this hole to lock the two sections together and to prevent relative rotation thereof. Thus the base and intermediate sections of the composite valve casing are assembled and the upper bifurcated section 26 of the valve stem is projecting above the partition wall 16 of the coupling member 14 with the square portion 25 of the valve stem positioned within the square opening in the cap 12 and the square opening 17 in the partition or wall 16, it being understood that prior to the application of the said cap to the threaded portion 11, packing 13 has been inserted within the socket or bore at the upper end of the intermediate section of the valve casing and that the cap 13 has been screwed down upon the threaded portion 11 to a sufficient extent to compress the said packing tightly about the cylindrical portion 23 of the valve stem to effect a leak-proof joint.

The entire valve stem is then raised a sufficient distance to lift the square portion 25 out of contact with the square openings in the cap 12 and in the partition or wall 16, and the spring 32 and cup shaped detent 23 are placed within socket 19, whereupon the upper section 15 of the valve casing is moved downwardly over the upper section 26 of the valve stem, with the spline or guide 22 positioned between the opposed faces of the sections 27 and 28, and with the segmental openings 30 and 31 positioned adjacent said spline or guide 22. The entire upper section 15 is then rotated so that its lower threaded portion screws into the upper portion of the coupling 14, this rotation of the section 15 being accomplished while the square portion 25 of the valve stem is out of engagement with the square opening in the cap 12 and with the square opening 17 in the partition or wall 16. The operating handle or "key" is then inserted through the opening 20 until the disc 37 rests within the socket 21. During the insertion of the handle or "key" the inner end thereof enters within the cup shaped detent 33 and compresses the same inwardly of the socket 19 against the tension of the spring 32, the pinion 36 sliding into engagement with the teeth 29 of the rack on section 28 of the valve stem. It is to be particularly noted that the inner end of the stem 34 extends a sufficient distance beyond the pinion 36 to effect the movement of the detent 33 out of engagement with either the segmental openings 30 and 31 and out of the line of travel of the valve stem, and that the disc 37 is so spaced from the pinion 36 that when said disc engages within the socket 21, the detent 33 is compressed within the socket and the pinion 36 is properly engaged with the teeth 29. When thus inserted, the stem 34 can be readily rotated by means of the handle 35 to move the valve disc 6 to open, closed, or intermediate positions with respect to the valve seats 4 and 5. When the valve disc 6 is moved to its fully closed or fully open position and the handle or "key" removed, the spring 32 forces the detent 33 into engagement with the segmental openings 30 or 31, respectively, thus locking the valve in closed or open position, in which position the valve will remain until the same or a similar handle or "key" is again inserted to depress the detent 33 out of engagement with the opening 30 or 31 and to move the valve disc to open, or to closed, or to an intermediate position with respect to the valve seats 4 and 5. It is to be particularly noted that the cup shaped detent 33 serves as a means for locking the valve in either open or closed position, and that it functions as an inner bearing for the stem 34.

When the valve disc 6 is in closed position, the square portion 25 of the valve stem is in engagement with the square opening 17 in the partition or wall 16 and with the square opening in the cap 12, which cap and the portion 11 with which it is engaged are both provided with cooperating "left-hand" threads. Further, the spline or guide 22 is engaged between the sections 27 and 28 of the upper portion 26 of the valve stem, which engagement prevents relative rotation between the valve stem and upper casing section 15. The locking pin 38 functions to prevent relative rotation of the intermediate portion of the composite valve casing with respect to the base portion 1 thereof. Hence, when the valve disc 6 is in closed position it would be impossible to unscrew the several parts of the casing to effect an unauthorized opening of the valve, as the engagement between the square portion 25 of the valve stem with the square opening 17 in the partition 16 and with the square opening in the cap 12 would effectively prevent the coupling 14 from being unscrewed; the engagement between the spline or guide 22 and the walls of the sections 27 and 28 of the upper end 26 of the valve stem, would effectively prevent the upper section 15 of the valve casing from being unscrewed; and the locking pin 38 would prevent the intermediate section from being unscrewed from the base section 1. Thus, when the parts are assembled as above defined, and the valve disc 6 moved to closed position, the casing cannot be disassembled to obtain access to the valve. Any attempt to drill out the locking pin 38 to permit the unscrewing of the intermediate portion of the valve casing from the base portion 1 thereof, would not accomplish any useful purpose and would result in an open service line.

It will be obvious that the arrangement, size and pitch of the teeth 29 which constitute the rack, and of the teeth on the pinion 36, may be varied so that an operating handle or "key" which will be effective to unlock and actuate one valve or a selected series of valves, will not function to operate another valve or another series of valves.

While I have elected to describe my improved valve as used in connection with water supply mains, it is to be understood that its use is not so restricted, and that the valve may be used in any system or pipe line where it is found desirable to employ a valve which can be moved to open or closed position, locked therein, and only unlocked and moved to an opposite position by the employment of a specific operating handle or "key." Among additional uses which will suggest themselves to those skilled in the art, may be mentioned outside hose connections, i. e., valves to which hose may be attached for sprinkling lawns, gardens, etc., and wherein it would be highly desirable to employ a "lock valve" with a removable handle or "key," to prevent tampering or unauthorized use of the water supply. Or the valve of my present invention could be successfully and satisfactorily used on tank wagons, tank trucks, tank cars or the like, where it would be desirable to employ a valve that could be locked in open or closed position and maintained in such position until operated to the opposite position by means of the special, removable, operating handle or "key." Obviously, the valve is not restricted to use in connection with liquids but would find utility in connection with the control of gases.

It is to be understood that the form of my invention herein shown and described is to be taken as a preferred embodiment of the invention and that various changes may be made in the shape, construction, and arrangement of parts without departing from the spirit of the invention or the scope of the subjoined claims.

I claim:

1. In a machine element locking device, the combination of a reciprocable member adapted for attachment to the machine element to control the position thereof, said member having a bifurcated portion forming two sections having spaced, parallel inner faces, the inner face of one of which sections is provided with a gear rack; an elongated casing enclosing the bifurcated portion of said member and having an opening in the side wall thereof adjacent said gear rack, said casing having on its inner surface an axially extending spline adapted to enter the space between the inner faces of the bifurcated portion of said member to guide said member during the reciprocating movements thereof; and an operating handle insertable into said casing through the opening therein and having a pinion engaging the gear rack, whereby rotation of said handle will reciprocate said member within said casing to control the position of the machine element attached to said member.

2. In a machine element locking device, the combination of a reciprocable member adapted for attachment to the machine element to control the position thereof, said member having a bifurcated portion forming two sections having spaced, parallel inner faces, the inner face of one of which sections is provided with a gear rack, said member having a locking recess therein; an elongated casing enclosing the bifurcated portion of said member and said recess and having an opening in the side wall thereof adjacent said gear rack; a spring-pressed locking detent mounted in the casing and, in one position of the member, engaging within the recess in said member to lock said member against reciprocation within said casing; and an operating handle insertable into said casing through the opening therein and having a pinion engaging the gear rack, whereby rotation of said handle will reciprocate said member within said casing to control the position of the machine element attached to said member, said handle, when inserted into said casing, engaging the locking detent to release the same from engagement with said recess.

3. In a machine element locking device, the combination of a reciprocable member adapted for attachment to the machine element to control the position thereof, said member having a bifurcated portion forming two sections having spaced, parallel inner faces, the inner face of one of which sections is provided with a gear rack, said member having a locking recess therein; an elongated casing enclosing the bifurcated portion of said member and having an opening in the side wall thereof adjacent said gear rack, said casing having a socket disposed radially of the axis of said casing and in alignment with the opening therein; a cup-shaped, spring-pressed locking detent mounted within said socket with its open end facing inwardly of the casing, said detent adapted to enter the locking recess to lock said member in a predetermined position, and an operating handle insertable into said casing through the opening therein and having a pinion engaging said gear rack, whereby rotation of said handle will reciprocate said member within said casing to control the position of the machine element attached to said member, said handle, when inserted into said casing, engaging the locking detent to release the same from engagement with said recess, and said cup-shaped detent serving as an inner bearing for the operating handle during the rotation of said handle.

4. In a machine element locking device the combination of a reciprocable member adapted for attachment to the machine element to control the position thereof, said member having a bifurcated portion forming two sections having spaced, parallel inner faces, the inner face of one of which sections is provided with a gear rack, each of said sections having a segmental recess therein which, together, constitute a locking recess; an elongated casing enclosing the bifurcated portion of said member and said segmental recesses and having an opening in the side wall thereof adjacent said gear rack; a spring-pressed locking detent mounted in the casing and, in one position of the member, engaging within the locking recess formed by the two segmental recesses to lock said member against reciprocation within said casing; and an operating handle insertable into said casing through the opening therein and having a pinion engaging the gear rack, whereby rotation of said handle will reciprocate said member within said casing to control the position of the machine element attached to said member, said handle, when inserted into said casing, engaging the locking detent to release the same from engagement with the locking recess.

5. In a machine element locking device the combination of a reciprocable member adapted for attachment to the machine element to control the position thereof, said element having a locking recess therein; an elongated casing enclosing that portion of said member provided with said recess, said casing having a socket and an opening both of which are disposed radially of the axis of said casing with said socket in alignment with said opening; a spring-pressed locking detent mounted within said socket and adapted to enter the locking recess to lock said member in a predetermined position; and an operating handle insertable into said casing through the opening therein and adapted to reciprocate said member within said casing upon release of said locking detent, said handle, when inserted into said casing engaging the detent to release said detent from engagement with said recess, said detent serving as an inner bearing for said operating handle during the reciprocating movements of said member within said casing.

6. In a machine element locking device, the combination of a reciprocable member adapted for attachment to the machine element to control the position thereof, said member having a pair of axially spaced locking recesses therein; an elongated casing enclosing that portion of said member provided with said recesses, said casing having a socket and an opening both of which are disposed radially of the axis of said casing with said socket in alignment with said opening; a cup-shaped, spring-pressed locking detent mounted within said socket with its open end facing inwardly of the casing, said detent adapted to normally engage within one of the spaced recesses in said member to lock said member in a predetermined position; and an operating handle insertable into said casing through the opening therein and adapted to reciprocate said member within said casing upon release of said locking detent from one of said recesses, said handle, when inserted into said casing, forcing said detent out of engagement with the recess with which such detent is engaged, and said cup-shaped detent serving as an inner bearing for said operating handle during the reciprocating movements of said member within said casing.

7. In a machine element locking device, the combination of a reciprocable member provided with a gear rack portion and adapted for attachment to the machine element to control the position thereof, said member having a locking recess near one end of its gear rack portion; an elongated casing enclosing the gear rack portion of the member at said recess and having a socket and an opening both of which are disposed radially of the axis of said casing with said socket in alignment with said opening; a spring-pressed locking detent mounted within said socket and adapted to enter the locking recess to lock said member in a predetermined position; and an operating handle insertable into said casing through the opening therein and having a pinion engaging said gear rack portion, rotation of said handle and pinion reciprocating said member within said casing upon release of said locking detent, and said handle, when inserted into said casing, engaging said detent to release the same from engagement with said recess, said detent serving as an inner bearing for said operating handle during the reciprocating movements of said member within said casing.

8. In a machine element locking device, the combination of a reciprocable member provided with a gear rack portion and adapted for attachment to the machine element to control the position thereof, said member having a pair of axially spaced locking recesses, one of which is located at each end of the gear rack portion; an elongated casing enclosing the gear rack portion of the member at said recesses, said casing having a socket and an opening both of which are disposed radially of the axis of said casing with said socket in alignment with said opening; a cup-shaped, spring-pressed locking detent mounted within said socket with its open end facing inwardly of the casing, said detent adapted to normally engage within one of the spaced recesses in said member to lock said member in a predetermined position; and an operating handle insertable into said casing through the opening therein and having a pinion engaging said gear rack portion, rotation of said handle and pinion reciprocating said member within said casing upon release of said locking detent, and said handle, when inserted into said casing, forcing said detent out of engagement with the recess with which said detent is engaged, and said cup-shaped detent serving as an inner bearing for said operating handle during rotation of said handle.

JOSEPH E. WALL.